US010288944B2

(12) United States Patent
Jamshidi Roudbari et al.

(10) Patent No.: US 10,288,944 B2
(45) Date of Patent: May 14, 2019

(54) DISPLAY BORDER AREA WITH DUAL TRENCH STRUCTURES

(71) Applicant: Apple Inc., Cupertino, CA (US)

(72) Inventors: Abbas Jamshidi Roudbari, Sunnyvale, CA (US); Shih-Hung Yeh, Taipei (TW); Ting-Kuo Chang, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 216 days.

(21) Appl. No.: 14/923,178

(22) Filed: Oct. 26, 2015

(65) Prior Publication Data
US 2017/0003526 A1 Jan. 5, 2017

Related U.S. Application Data

(60) Provisional application No. 62/188,392, filed on Jul. 2, 2015.

(51) Int. Cl.
G02F 1/1339 (2006.01)
G02F 1/1345 (2006.01)

(52) U.S. Cl.
CPC .......... *G02F 1/1339* (2013.01); *G02F 1/1345* (2013.01)

(58) Field of Classification Search
None
See application file for complete search history.

(56) References Cited

U.S. PATENT DOCUMENTS

| 2005/0184927 | A1* | 8/2005 | Kwak | ................. H01L 27/3276 345/45 |
| 2007/0052352 | A1 | 3/2007 | Im et al. | |
| 2008/0170028 | A1* | 7/2008 | Yoshida | ................... G09G 3/20 345/100 |
| 2011/0255041 | A1* | 10/2011 | Inoue | ................. G02F 1/133723 349/123 |
| 2012/0013970 | A1 | 1/2012 | Shin et al. | |
| 2012/0188498 | A1* | 7/2012 | Nishino | ................ G02F 1/1345 349/143 |
| 2014/0027791 | A1* | 1/2014 | Cho | ........................ H01L 33/44 257/88 |

(Continued)

FOREIGN PATENT DOCUMENTS

KR 20110127035 11/2011

*Primary Examiner* — Edward J Glick
*Assistant Examiner* — Anthony G. Quash
(74) *Attorney, Agent, or Firm* — Treyz Law Group, P.C.; Jason Tsai

(57) ABSTRACT

A display may have an active area surrounded by a border area. The display may be a liquid crystal display having a liquid crystal layer sandwiched between a color filter layer and a thin-film transistor layer. The liquid crystal layer may be retained within the display using a ring of sealant that is dispensed along the border area on the thin-film transistor layer. The thin-film transistor layer may include at least a substrate, a dielectric layer formed over the substrate, a first planarization layer formed on the dielectric layer, and a second planarization layer formed on the first planarization layer. A first continuous trench structure may be formed along the border of the display to help prevent moisture seepage. A second trench structure that is separate from the first trench structure may be formed along the border of the display to help provide proper sealant adhesion.

18 Claims, 12 Drawing Sheets

(56) References Cited

U.S. PATENT DOCUMENTS

2014/0043574 A1\* 2/2014 Ichimura .............. G02F 1/1339
   349/138
2015/0090983 A1   4/2015 Ozawa
2016/0131929 A1\* 5/2016 Lee .................... H01L 51/5246
   257/72

\* cited by examiner

DISPLAY BORDER AREA WITH DUAL TRENCH STRUCTURES

This application claims the benefit of provisional patent application No. 62/188,392 filed on Jul. 2, 2015, which is hereby incorporated by reference herein in its entirety.

BACKGROUND

This relates generally to electronic devices and, more particularly, to electronic devices with displays.

Electronic devices often include displays. For example, cellular telephones, computers, and televisions have displays. The center of a display such as a liquid crystal display contains an array of pixels. This portion of the display, which is sometimes referred to as the active area of the display, is used to display images to a user. Peripheral circuits and other portions of the display that do not display images form a border that surrounds the active area. This border is sometimes referred to as the border area of the display.

A conventional liquid crystal display includes a thin-film transistor layer, a color filter layer, and liquid crystal material interposed between the thin-film transistor layer and the color filter layer. A ring of epoxy is formed along the border of the display to help encapsulate the liquid crystal material between the thin-film transistor layer and the color filter layer.

The thin-film transistor layer typically includes a glass substrate, an oxide layer formed on the glass substrate, and an organic planarization layer formed on the oxide layer. The presence of the organic planarization layer in the border area is, however, susceptible to moisture leakage (i.e., moisture can sometimes seep through the interface of the planarization layer and oxide layer). As a result, a portion of the planarization layer has to be removed in the border area to form a trench region that is devoid of the planarization material. This trench region may help provide good adhesion for the epoxy while providing moisture blocking.

To save cost, some liquid crystal displays are fabricated using a mask that patterns both the oxide layer and the planarization layer simultaneously. In such displays, it may not be possible to place active metal routing structures within the trench region since the active metal routing structures may be subject to oxide undercutting during the formation of the moisture blocking trench, which can substantially degrade the mechanical stability of those metal routing structures. Moving all metal routing structures out of the moisture blocking trench region will, however, substantially increase the border area of the display.

It would therefore be desirable to be able to provide electronic devices with improved display structures having smaller display borders while providing adequate moisture blocking.

SUMMARY

An electronic device may be provided with a display. The display may have an active area and a border area. The active area may have a rectangular array of display pixels to produce images for viewing by a user. The border area may have the shape of a rectangular ring that surrounds the active area and that serves as a border for the display.

In accordance with an embodiment, a display is provided that includes a substrate, a moisture blocking trench that is formed over the substrate in the border area, and a sealant adhesion improvement trench that is separate from the moisture blocking trench and that is formed over the substrate in the border area. The display may also include sealant that is dispensed at least partially within the sealant adhesion improvement trench and liquid crystal material is that retained within the display by the sealant.

The moisture blocking trench may be narrower than the sealant adhesion improvement trench or vice versa. A passivation layer may be formed over the sealant adhesion improvement trench. The moisture blocking trench may be a continuous trench structure that completely surrounds the display, that is devoid of any conductive routing structures, and that is devoid of the passivation layer. In particular, the display may also include a conductive routing structure that is formed at least directly under the sealant adhesion improvement trench, where the sealant adhesion improvement trench is at least narrower than the conductive routing structure.

In accordance with another embodiment, a method of manufacturing a display having an active area and a border area is provided. The method includes forming a dielectric layer over a substrate, forming a planarization layer on the dielectric layer, forming a moisture blocking trench in the border area by simultaneously removing a portion of the planarization layer (e.g., an organic polymer layer) and the dielectric layer using a first lithographic mask, and forming conductive routing structures in the border area only outside the moisture blocking trench. The method also includes forming a sealant adhesion improvement trench that is separate from the moisture block trench in the border area.

Sealant may be dispensed at least partially within the sealant adhesion improvement trench. The method may also include forming a conductive path on the dielectric layer directly under the sealant adhesion improvement trench, where the conductive path is at least wider than the sealant adhesion improvement trench. An additional planarization layer may be formed on the planarization layer. The moisture blocking trench and the sealant adhesion improvement trench may be completed by removing portions of the additional planarization layer using a second lithographic mask.

Further features of the invention, its nature and various advantages will be more apparent from the accompanying drawings and following detailed description.

DETAILED DESCRIPTION

Illustrative electronic devices that have housings that accommodate displays are shown in FIGS. 1, 2, 3, and 4.

Figure 1:
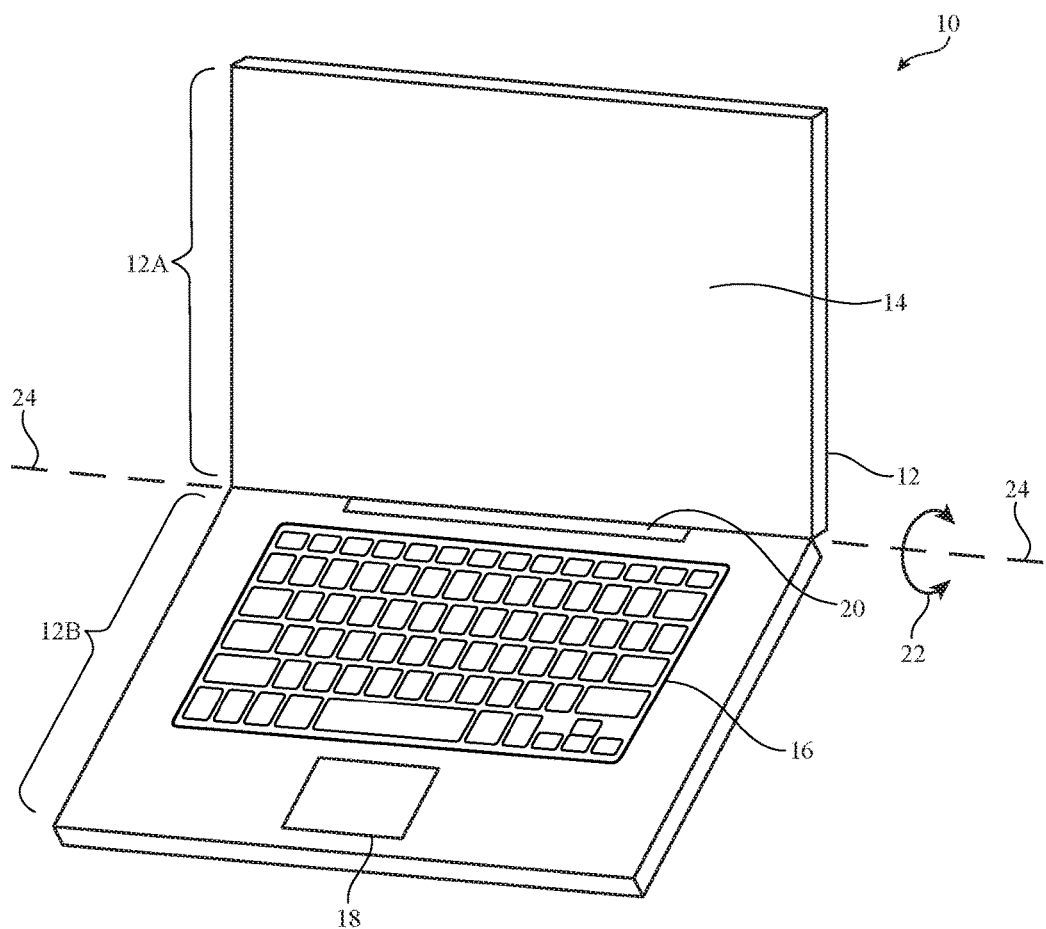
FIG. 1 is a perspective view of an illustrative electronic device such as a laptop computer with display structures in accordance with an embodiment.

Electronic device 10 of FIG. 1 has the shape of a laptop computer and has upper housing 12A and lower housing 12B with components such as keyboard 16 and touchpad 18. Device 10 has hinge structures 20 (sometimes referred to as a clutch barrel) to allow upper housing 12A to rotate in directions 22 about rotational axis 24 relative to lower housing 12B. Display 14 is mounted in housing 12A. Upper housing 12A, which may sometimes be referred to as a display housing or lid, is placed in a closed position by rotating upper housing 12A towards lower housing 12B about rotational axis 24.

Figure 2:
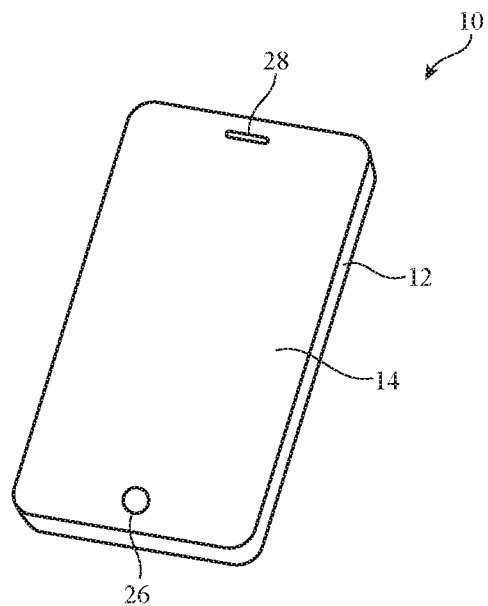
FIG. 2 is a perspective view of an illustrative electronic device such as a handheld electronic device with display structures in accordance with an embodiment.

FIG. 2 shows an illustrative configuration for electronic device 10 based on a handheld device such as a cellular telephone, music player, gaming device, navigation unit, or other compact device. In this type of configuration for device 10, housing 12 has opposing front and rear surfaces. Display 14 is mounted on a front face of housing 12. Display 14 may have an exterior layer that includes openings for components such as button 26 and speaker port 28.

Figure 3:
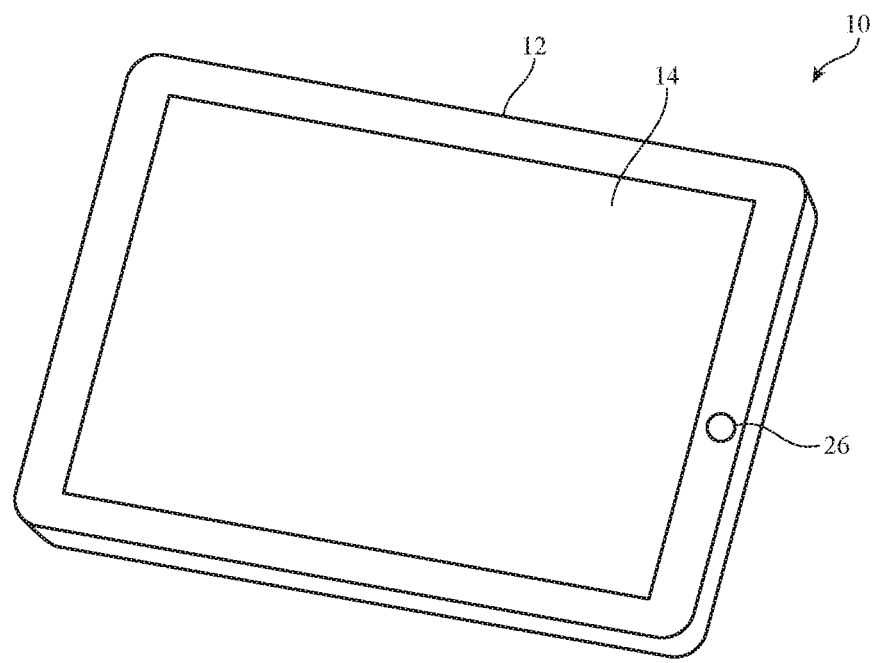
FIG. 3 is a perspective view of an illustrative electronic device such as a tablet computer with display structures in accordance with an embodiment.

In the example of FIG. 3, electronic device 10 is a tablet computer. In electronic device 10 of FIG. 3, housing 12 has opposing planar front and rear surfaces. Display 14 is mounted on the front surface of housing 12. As shown in FIG. 3, display 14 has an external layer with an opening to accommodate button 26.

Figure 4:
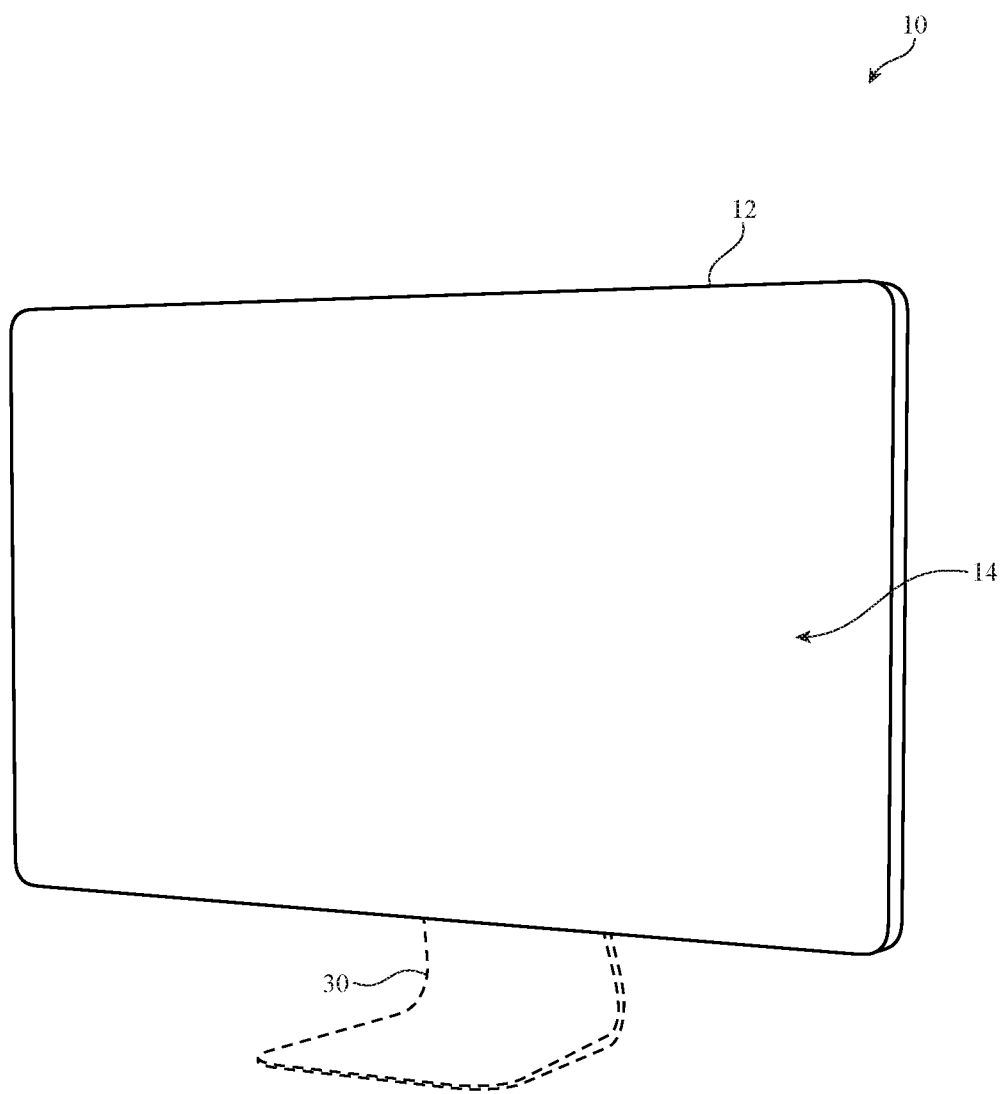
FIG. 4 is a perspective view of an illustrative electronic device such as a display for a computer or television with display structures in accordance with an embodiment.

FIG. 4 shows an illustrative configuration for electronic device 10 in which device 10 is a computer display or other display, a computer that has an integrated computer display, or other electronic equipment. Display 14 is mounted on a front face of housing 12. With this type of arrangement, housing 12 for device 10 may be mounted on a wall or may have an optional structure such as support stand 30 to support device 10 on a flat surface such as a table top or desk.

Display 14 may be a liquid crystal display or a display formed using other display technologies (e.g., a plasma display, an organic light-emitting diode display, an electrophoretic display, an electrowetting display, a hybrid display that incorporates multiple display types into a single display structure, etc.). Liquid crystal display structures for forming display 14 are sometimes described herein as an example.

Figure 5:
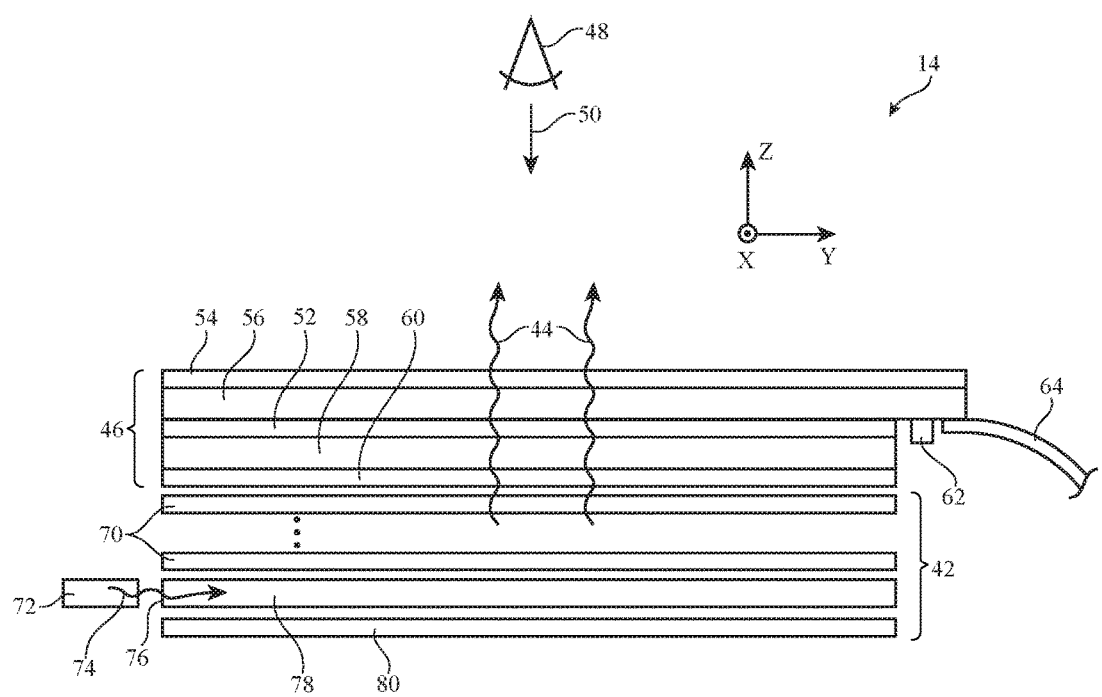
FIG. 5 is a cross-sectional side view of a liquid crystal display in accordance with an embodiment.

A cross-sectional side view of an illustrative configuration that may be used for display 14 of device 10 (e.g., for display 14 of the devices of FIG. 1, FIG. 2, FIG. 3, FIG. 4 or other suitable electronic devices) is shown in FIG. 5. As shown in FIG. 5, display 14 may include backlight structures such as backlight unit 42 for producing backlight 44. During operation, backlight 44 travels outwards (vertically upwards in dimension Z in the orientation of FIG. 5) and passes through display pixel structures in display layers 46. This illuminates any images that are being produced by the display pixels for viewing by a user. For example, backlight 44 may illuminate images on display layers 46 that are being viewed by viewer 48 in direction 50.

Display layers 46 may be mounted in chassis structures such as a plastic chassis structure and/or a metal chassis structure to form a display module for mounting in housing 12 or display layers 46 may be mounted directly in housing 12 (e.g., by stacking display layers 46 into a recessed portion in housing 12).

Display layers 46 may include a liquid crystal layer such a liquid crystal layer 52. Liquid crystal layer 52 may be sandwiched between display layers such as display layers 58 and 56. Layers 56 and 58 may be interposed between lower polarizer layer 60 and upper polarizer layer 54.

Layers 56 and 58 may be formed from transparent substrate layers such as clear layers of glass or plastic. Layers 56 and 58 may be layers such as a thin-film transistor layer and/or a color filter layer. Conductive traces, color filter elements, transistors, and other circuits and structures may be formed on the substrates of layers 56 and 58 (e.g., to form a thin-film transistor layer by forming transistor circuits on a first glass layer and to form a color filter layer by patterning color filter elements on a second glass layer). Touch sensor electrodes may also be incorporated into layers such as layers 56 and 58 and/or touch sensor electrodes may be formed on other substrates.

With one illustrative configuration, layer 56 may be a thin-film transistor layer that includes an array of thin-film transistors and associated electrodes (display pixel electrodes) for applying electric fields to liquid crystal layer 52 and thereby displaying images on display 14. Layer 58 may be a color filter layer that includes an array of color filter elements for providing display 14 with the ability to display color images.

During operation of display 14 in device 10, control circuitry (e.g., one or more integrated circuits on a printed circuit board) may be used to generate information to be displayed on display 14 (e.g., display data). The information to be displayed may be conveyed to display driver integrated circuit 62 and/or thin-film transistor circuitry on one or more display layers 46 using a signal path such as a signal path formed from conductive metal traces in flexible printed circuit 64 (as an example).

Display driver integrated circuit 62 may be mounted on thin-film-transistor layer 56 or elsewhere in device 10. Signal lines in flexible printed circuit 64 may be used in routing signals between control circuitry in device 10 and thin-film-transistor layer 56. If desired, display driver integrated circuits such as circuit 62 may instead be mounted on a printed circuit. Printed circuits in device 10 may include rigid printed circuit boards (e.g., layers of fiberglass-filled epoxy) and flexible printed circuits (e.g., flexible sheets of polyimide or other flexible polymer layers).

Backlight structures 42 may include a light guide plate such as light guide plate 78. Light guide plate 78 may be formed from a transparent material such as clear glass or plastic. During operation of backlight structures 42, a light source such as light source 72 may generate light 74. Light source 72 may be, for example, an array of light-emitting diodes.

Light 74 from light source 72 may be coupled into edge surface 76 of light guide plate 78 and may be distributed in dimensions X and Y throughout light guide plate 78 due to the principal of total internal reflection. Light guide plate 78 may include light-scattering features such as pits or bumps. The light-scattering features may be located on an upper surface and/or on an opposing lower surface of light guide plate 78.

Light 74 that scatters upwards in direction Z from light guide plate 78 may serve as backlight 44 for display 14. Light 74 that scatters downwards may be reflected back in the upwards direction by reflector 80. Reflector 80 may be formed from a reflective material such as a layer of white plastic or other reflective materials.

To enhance backlight performance for backlight structures 42, backlight structures 42 may include optical films 70. Optical films 70 may include diffuser layers for helping to homogenize backlight 44 and thereby reduce hotspots, compensation films for enhancing off-axis viewing, and brightness enhancement films (also sometimes referred to as turning films) for collimating backlight 44. Optical films 70 may overlap the other structures in backlight unit 42 such as light guide plate 78 and reflector 80. For example, if light guide plate 78 has a rectangular footprint in the X-Y plane of FIG. 5, optical films 70 and reflector 80 may have a matching rectangular footprint. If desired, optical films may be incorporated into other layers of display 14. For example, compensation films may be incorporated into polarizer 54 (as an example).

The display layer configuration described above in which thin-film transistor layer 56 is formed above the color filter layer 58 is merely illustrative. If desired, the order of these layers can be switched while still benefitting from the advantages of the present invention (e.g., the color filter layer can alternatively be formed above the thin-film transistor layer).

Figure 6:
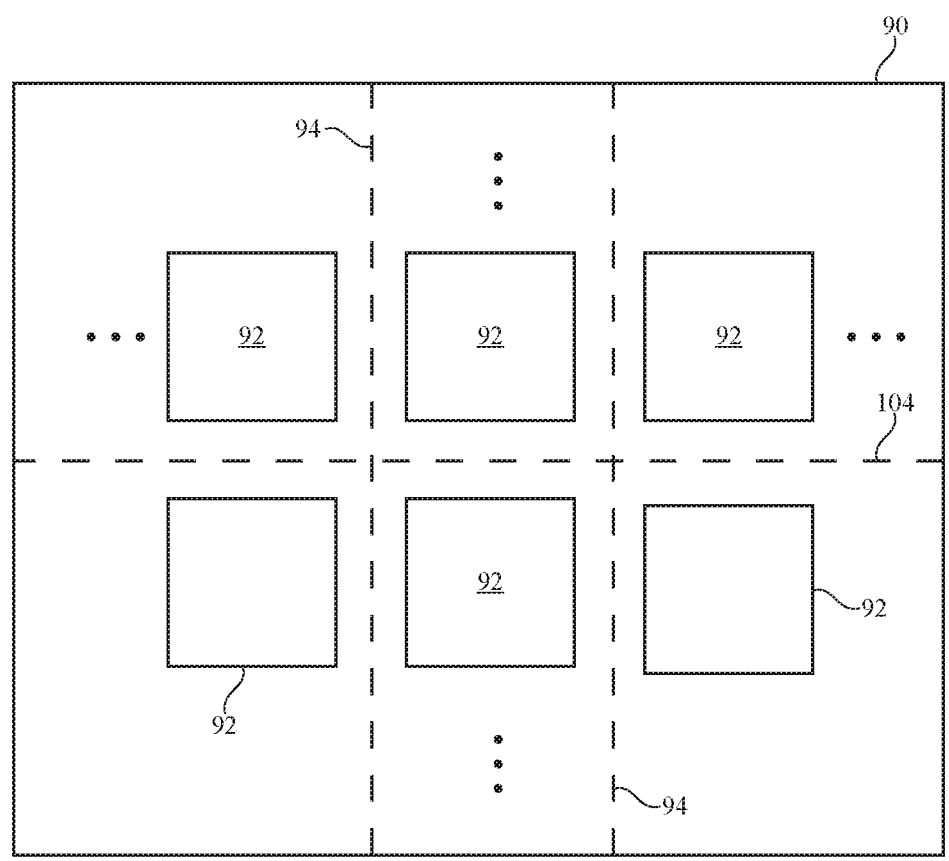
FIG. 6 is a diagram showing how a display mother glass can be diced into multiple display panel cells in accordance with an embodiment.

Display layers 46 that are assembled within an electronic device (sometime referred to collectively as a single "display panel cell") may be formed from a display wafer or a display mother glass. FIG. 6 is a diagram showing how a display mother glass 90 can be diced into multiple display panel cells 92 in accordance with an embodiment. As shown in FIG. 6, glass cutting equipment may be used to slice mother glass 300 along scribe lines 94 to separate the mother glass 90 into individual display panel cells 92 (e.g., similar to how an integrated circuit wafer can be diced into multiple individual integrated circuit dies).

During dicing operations, however, the cutting motion can potentially result in cracks, debonding of certain interfaces in the display stackup (e.g., layers that are formed on the glass substrate may become delaminated due to the stress induced by the dicing operation), and/or other mechanical defects at one or more edges of the display. To ensure that the display layers are sufficiently crack resistant, the display layers may be imposed with certain structural requirements at the borders of each display cell. For example, the edge of each display cell may be required to exhibit a uniform thickness to ensure mechanical rigidity during dicing operations.

Figure 7:
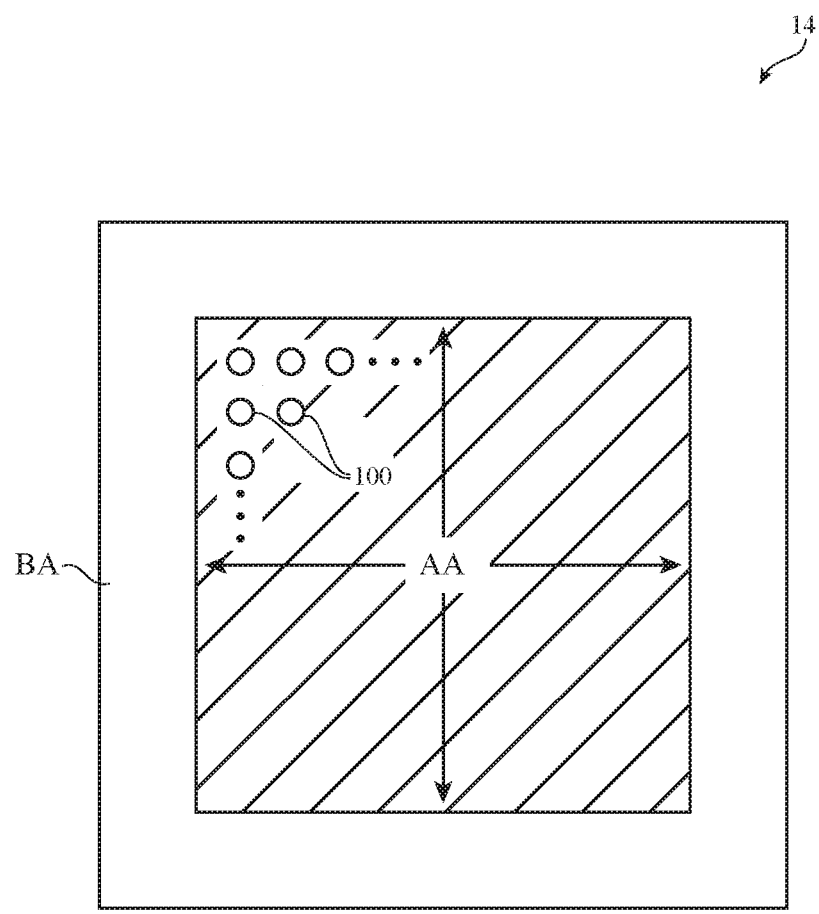
FIG. 7 is a top view of a display having a border area that runs along the rectangular periphery and that surrounds an active area of the display in accordance with an embodiment.

FIG. 7 is a top view showing display 14 (i.e., a singulated display panel cell) having a border area BA that surrounds an active area AA of the display. The active area AA of display 14 may include a rectangular array of display pixels 100. As shown in FIG. 7, the border area BA may run along some or all of the peripheral edges of the active area AA. For example, display 14 may have a border area BA that has the shape of a rectangular ring and that forms a border running along all four sides of a central rectangular active area AA.

To hide signal traces and other internal device structures from view by a user, border area IA may be provided with opaque border structures. The border structures may include a visible layer such as a layer of white material or a layer of material having other colors and may optionally include one or more additional layers (e.g., a layer of black material) to ensure that the border structures are sufficiently opaque to block internal components from view and/or to help prevent stray backlight from leaking out of display 14.

Figure 8:
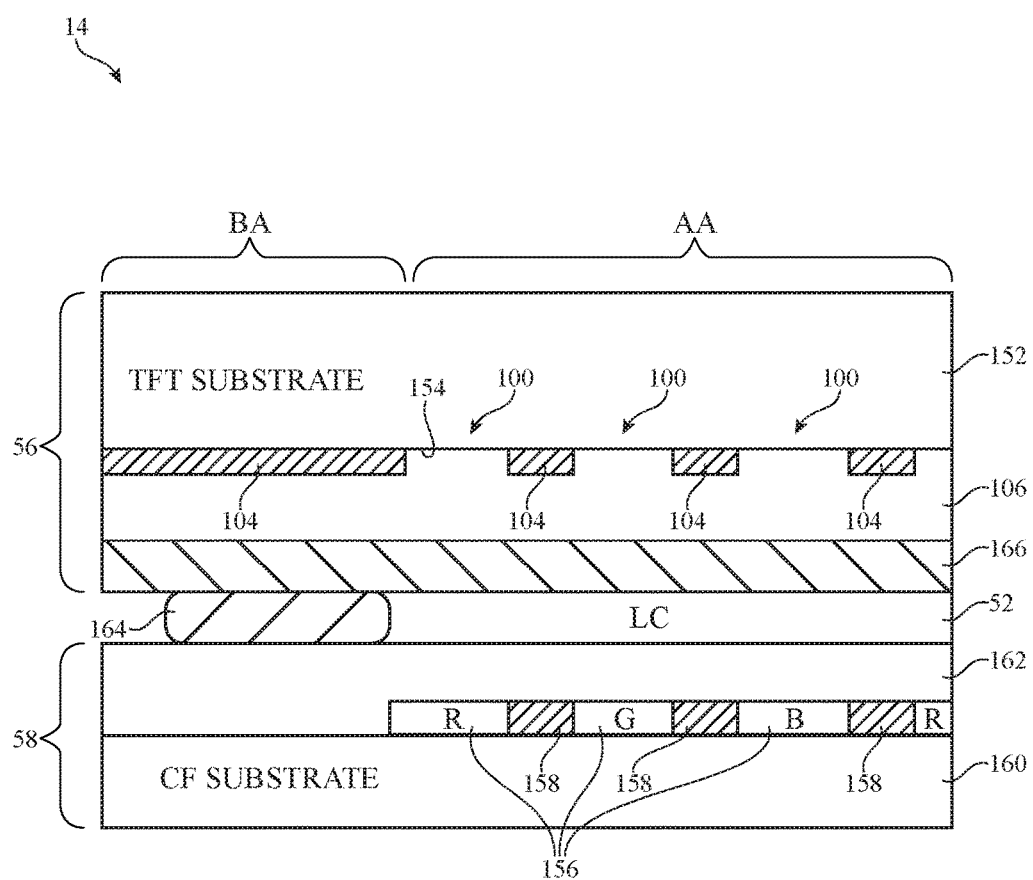
FIG. 8 is a cross-sectional side view of an illustrative display showing how sealant may be formed in the border area between a thin-film transistor layer and a color filter layer.

In addition to mechanical rigidity requirements for the display edge portions, the border area may also be imposed with structural requirements that facilitate the adhesion of sealants in a liquid crystal display (e.g., sealant material that contains the liquid crystal material between the thin-film transistor layer and the color filter layer). FIG. 8 is a cross-sectional side view of an illustrative display 14 showing how sealant may be formed in the border area BA between thin-film transistor (TFT) layer 56 and color filter (CF) layer 58.

As shown in FIG. 8, thin-film transistor layer 56 has substrate layer 152 (e.g., a clear glass layer, a transparent plastic substrate, or other substrate material). Border structures 104 are formed on lower (inner) surface 154 of substrate 152. Layer 104 may, for example, be a layer of black ink or other opaque masking material. The presence of layer 104 helps ensure that the border area BA is opaque to the user. In active area AA, layer 104 may form a black matrix having a series of openings associated with respective pixels 100. Each opening in the black matrix on thin-film transistor substrate layer 152 may be aligned with a respective color filter element 156 in color filter layer 58.

Thin-film transistor layer 56 may further include thin-film transistor circuitry 166. Planarization layer 106 is used to planarize layer 104 so that thin-film transistor structures 166 can be formed on the lower side of thin-film transistor substrate layer 152. With one suitable arrangement, planarization layer 106 is formed from a black mask compatible material having a low dielectric constant such as a spin-on glass (SOG). For example, planarization layer 106 may be formed from a spin-on glass such as a silicon oxide based spin-on glass (e.g., a silicate spin-on glass) or other silicate layer.

During thin-film transistor formation, thin-film transistor structures and associated routing circuitry in layer 166 may be subjected to elevated processing temperatures (e.g., temperatures of 350° C. or higher). Layers 104 and spin-on glass planarization layer 106 are preferably able to withstand processing at these elevated temperatures (i.e., spin-on glass layer 106 will not experience diminished transparency and layer 104 will not degrade).

Color filter layer 58 may have a clear glass or plastic layer such as color filter layer substrate 160. An array of color filter elements 156 (e.g., red, green, and blue color filter elements or color filter elements of other colors) may be formed for display pixels 100. Color filter elements 156 may be formed in openings in color filter layer black matrix 158. A clear polymer planarization layer such as overcoat layer 162 may be used to cover color filter elements 156 and black matrix 158 on color filter layer substrate 160, thereby planarizing color filter layer 58.

Still referred to FIG. 8, liquid crystal layer 52 may be interposed between thin-film transistor layer 56 and color filter layer 58. A peripheral ring of epoxy or other sealant 164 may be used to retain liquid crystal material 52 in the center of display 14. To help ensure that sealant 164 can be properly adhered to the surface of the different display layers, the thin-film transistor layer 56 is sometimes provided with trench structures in the border area. The presence of a trench provides additional surface area for sealant 164 to attach, which may be a crucial factor in making sure that the sealant does not inadvertently peel away from the thin-film transistor layer during manufacturing or assembly.

Figure 9:
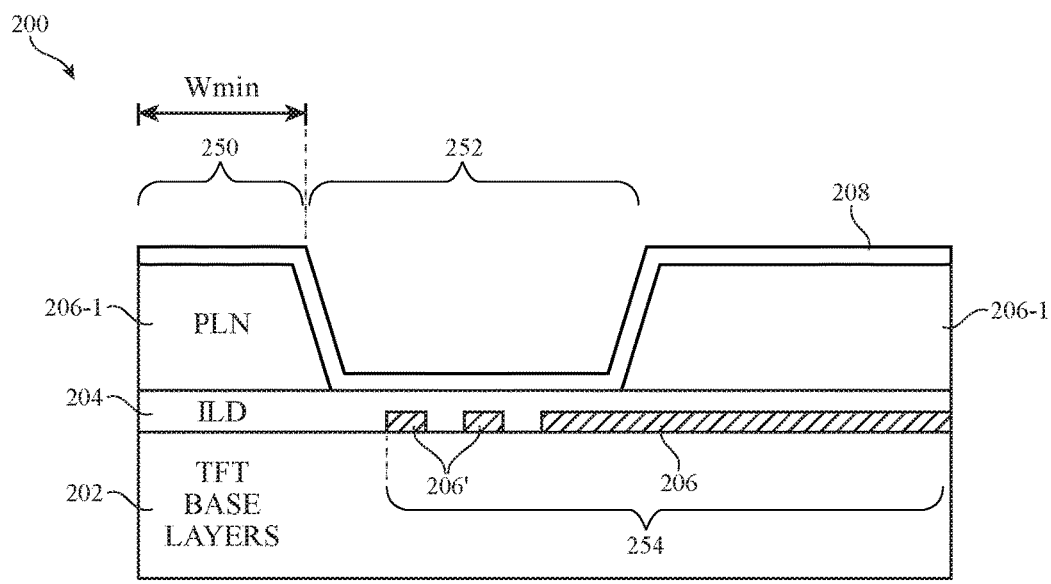
FIG. 9 is a cross-sectional side view of a conventional display thin-film transistor layer that includes a single organic planarization layer.

FIG. 9 is a cross-sectional side view of the border area of a conventional display thin-film transistor layer 200 that includes a single continuous border trench structure. As shown in FIG. 9, thin-film transistor layer 200 has TFT base layers 202 which may include a glass substrate and/or optional black masking structures and an associated planarization layer for the black masking structures.

Metal routing structures 206 are formed on the TFT base layers 202. Portions of the display border that includes metal routing structures (i.e., metal routing paths for carrying power supply signals and other control signals) can be referred to as the "active" border region 254. Interlayer dielectric (ILD) material 204 is formed over the metal routing structures 206. A single organic planarization (PLN) layer 206 is formed on the ILD layer 204.

In particular, TFT layer 200 may be fabricated using a first lithographic mask for patterning the ILD layer 204 and a second lithographic mask for separately patterning the PLN layer 206-1. Since separate masks are used for patterning the ILD layer 204 and the PLN layer 206-1, a trench such as trench region 252 can be formed in the PLN layer 206-1 without etching into the ILD layer 204. Since the organic PLN layer 206-1 is susceptible to moisture leakage (as described above in the Background section), trench region 252 that is devoid of any organic planarization material can help provide moisture blockage while also providing sufficient mechanical robustness for the adhesion of the sealant, which is dispensed at least partially into trench region 252. A minimum width Wmin for display edge portion 250 having the PLN layer 206-1 intact must be maintained to ensure that the display border is mechanically resistant to cracks during dicing operations. An insulation liner 208 is then deposited over the PLN layer 206-1 and in trench region 252.

Figure 10:
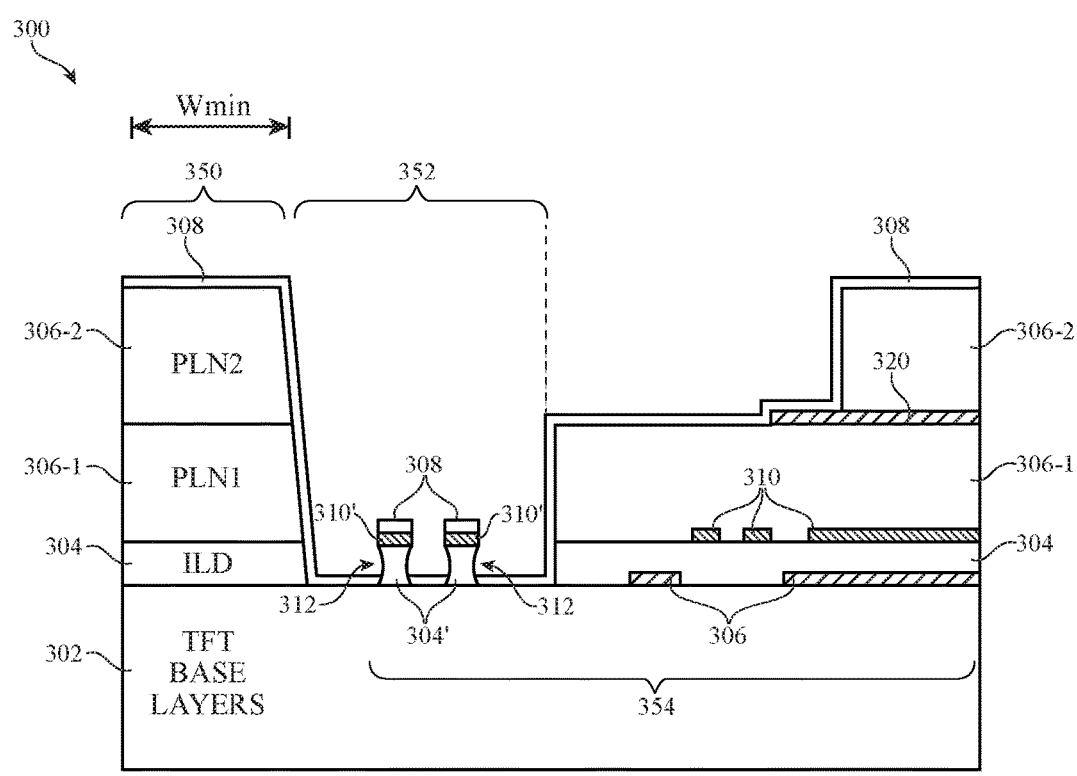
FIG. 10 is a cross-sectional side view of a display thin-film transistor layer that includes two planarization layers in accordance with an embodiment.

In certain embodiments, a display TFT layer 300 that includes two planarization layers is provided (see, e.g., a cross-sectional side view of the border area of layer 300 in FIG. 10). As shown in FIG. 10, thin-film transistor layer 300 has TFT base layers 302, which may include a transparent substrate and/or optional opaque masking structures and an associated planarization layer for the opaque masking structures (e.g., black border masking layer 104 and spin-on glass layer 106 as described in connection with FIG. 8).

Conductive routing structures such as metal routing structures in different interconnect routing layers may be formed over the TFT base layers 302. For example, first metal layer (M1) routing structures 306 may be formed on the TFT base layers 302. One or more interlayer dielectric (ILD) layers 304 (e.g., one or more layers of silicon oxide) may be formed over the M1 metal routing structures on the TFT base layers 302. Second metal layer (M2) routing structures 310 may be formed on ILD layer 304. At least some of the M2 metal routing structures may be connected to some of the M1 metal routing structures through vias (not shown in FIG. 10 for clarity) formed through the ILD layer 304.

A first planarization (PLN1) layer 306-1 may be formed over the M2 metal routing structures on the ILD layer 304. Third metal layer (M3) routing structures 320 may be formed on the PLN1 layer 306-1. At least some of the M3 metal routing structures may be connected to some of the M2 metal routing structures through vias (not shown) formed through the PLN1 layer. A second planarization (PLN2) layer 306-2 may then be formed over the M3 metal routing structures on layer 306-1. Planarization layers 306-1 and 306-2 may be formed from organic polymer material (as an example). A passivation layer such as oxide insulation layer 308 may be formed over the PLN2 layer to passivate thin-film transistor layer 300.

To save cost, TFT layer 300 may be fabricated using a first mask that simultaneously patterns both ILD layer 304 and the first planarization layer 306-1 and then using a second mask that separately patterns the second planarization layer 306-2. To maximize sealant adhesion while also blocking moisture penetration, both organic planarization layers 306-1 and 306-2 (the presence of which causes undesired moisture seepage) should be removed from the border area. As shown in the example of FIG. 10, a single continuous trench such as trench region 352 may be formed in the display border area. A minimum width Wmin for display edge portion 350 having both planarization layers 306-1 and 306-2 intact (which help provide sufficient mechanical rigidity at the very edge of the display) should be maintained to ensure that the display border is mechanically resistant to cracks during dicing operations.

As shown in the conventional arrangement of FIG. 9, it is possible to form active metal routing structures 206' directly under trench region 252 without any glaring fabrication issues since the planarization layer 206 and the ILD layer 204 are patterned using different lithographic masks (i.e., it is acceptable for the active border region 254 to overlap with the trench region 252).

In the configuration of FIG. 10, however, placement of active metal routing structures such as M2 routing structures 310' within trench region 352 may suffer from ILD undercutting 312 when partially forming trench region 352 using the first mask to simultaneously remove portions of planarization layer 306-1 and ILD layer 304 above and around routing structures 310'. Portions of the ILD layer supporting routing structures 310' such as portions 304' that have been degraded due to the oxide undercutting 312 may cause routing structures 310' in the trench region 352 to be mechanically unstable (e.g., overlapping the active border region 354 with the trench region 352 may cause undesirable reliability issues). However, moving all metal routing structures out of trench region 352 will substantially increase the border area of the display.

Figure 11:
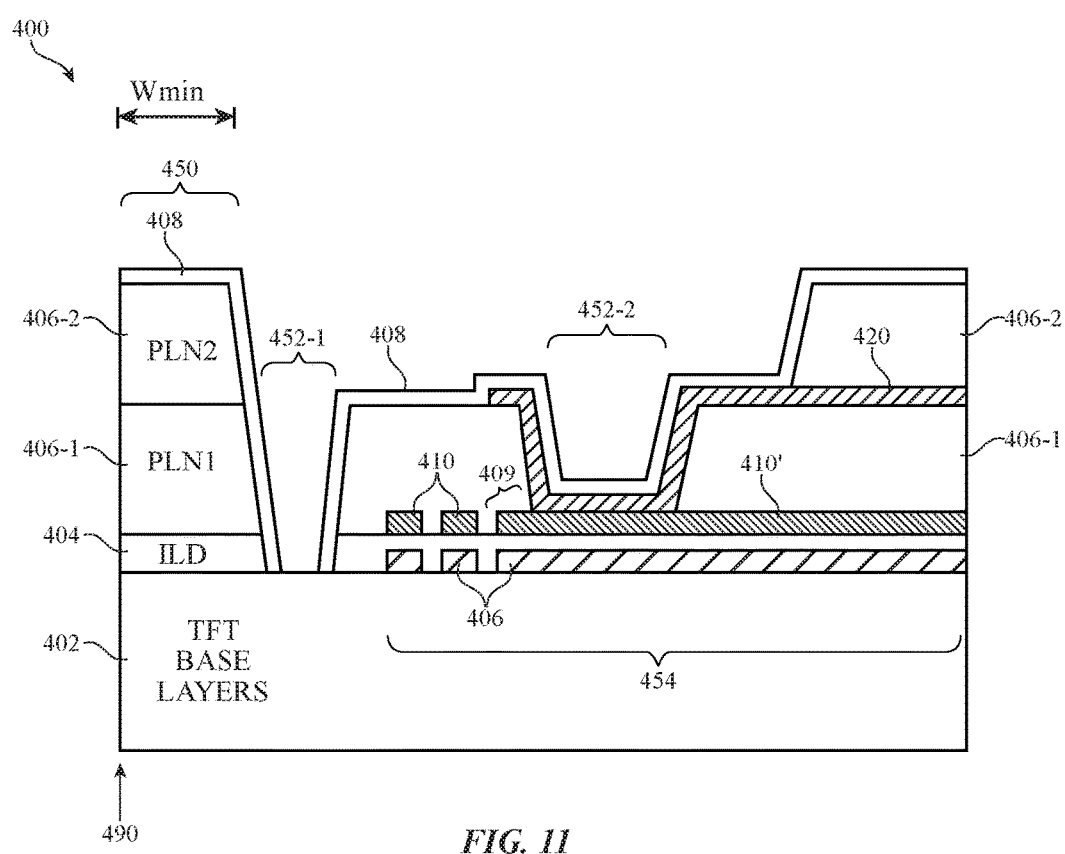
FIG. 11 is a cross-sectional side view of an illustrative display thin-film transistor layer that includes a moisture blocking trench and a separate sealant adhesion improvement trench in accordance with an embodiment.

In accordance with an embodiment of the present invention, a thin-film transistor (TFT) layer 400 that includes at least two separate trench structures in the border area is provided (see, e.g., FIG. 11). As shown in FIG. 11, thin-film transistor layer 400 has TFT base layers 402, which may include a transparent substrate (e.g., a glass substrate) and/or optional opaque masking structures and an associated planarization layer for the opaque masking structures (e.g., black border masking layer 104 and spin-on glass layer 106 as described in connection with FIG. 8).

Conductive routing structures such as metal routing structures in different interconnect routing layers may be formed over the TFT base layers 402. For example, first metal layer (M1) routing structures 406 may be formed on the TFT base layers 402. One or more interlayer dielectric (ILD) layers 404 (e.g., one or more layers of silicon oxide) may be formed over the M1 metal routing structures on the TFT base layers 402. Second metal layer (M2) routing structures 410 may be formed on ILD layer 404. At least some of the M2 metal routing structures may be connected to some of the M1 metal routing structures through vias (not shown in FIG. 11 for clarity) formed through the ILD layer 404.

A first planarization (PLN1) layer 406-1 may be formed over the M2 metal routing structures on the ILD layer 404. Third metal layer (M3) routing structures 420 may be formed on the PLN1 layer 406-1. At least some of the M3 metal routing structures may be connected to some of the M2 metal routing structures through vias formed through the PLN1 layer (see, e.g., region 452-2 in FIG. 11). A second planarization (PLN2) layer 406-2 may then be formed over the M3 metal routing structures on layer 406-1. Planarization layers 406-1 and 406-2 may be formed from organic polymer material (as an example). A passivation layer such as a silicon nitride insulation layer 408 may be formed over the PLN2 layer to passivate thin-film transistor layer 400.

To save cost, TFT layer 400 may also be fabricated using a first mask that simultaneously patterns both ILD layer 404 and the first planarization layer 406-1 and then using a second mask that separately patterns the second planarization layer 406-2. To maximize sealant adhesion while also blocking moisture penetration, both organic planarization layers 406-1 and 406-2 (the presence of which causes undesired moisture seepage) should be removed from the border area.

As shown in the example of FIG. 11, a first trench region 452-1 may be formed near the display edge portion 450. Similar to the other embodiments, a minimum width Wmin for display edge portion 450 having both planarization layers 406-1 and 406-2 intact (which help provide sufficient mechanical rigidity at the very edge 490 of the display) should be maintained to ensure that the display border is mechanically resistant to cracks during dicing operations. First trench region 452-1 may be devoid of the ILD material 404, the planarization material in layers 406-1 and 406-2, and also passivation liner 408 and is optimized for preventing moisture penetration from edge portion 450 towards the center of the display. The first trench 452-1 may be configured as a continuous ring structure that runs completely around the periphery of the display.

A second trench region 452-2 may be formed within the active border region 454. In particular, second trench region 452-2 should be formed directly over a sufficiently wide M2 metal routing structure 410' to prevent any ILD undercutting. Metal routing structures 410' may, for example, be wide metal traces for carrying power supply voltages such as ground voltages, positive power supply voltages, display common electrode voltages, or other global signals. As shown in FIG. 11, metal routing structure 410' may have an edge portion 409 that extends past the edge of trench region 452-2 so that no etching undercut will result when patterning planarization layer 406-1 to form trench 452-2. In this particular example, M3 metal routing structures 420 is also deposited within trench 452-2 to make contact with the M2 metal routing structure 410'. By taking advantage of the formation of trench 452-2 which at least partially exposes the underlying M2 routing path, another (M2)-to-M3 via connection need not be made. This is merely illustrative (i.e., M3 metal need not be formed in trench region 452-2).

Second trench region 452-2 may therefore be devoid of the planarization material in layers 406-1 and 406-2 and is optimized for proper sealant adhesion (e.g., sealant 164 in FIG. 8 may be at least partially formed in trench 452-2). In other words, trench 452-2 should be just wide enough to ensure that sealant does not inadvertently peel off from any mechanically induced stress during handling of the display. In general, trench 452-2 may be relatively wider than trench 452-1. The first trench 452-1 can be relatively narrow as long as adequate moisture protection is preserved.

By minimizing the width of the first trench 452-1 (sometimes referred to herein as the moisture blocking trench), active border circuitry in region 454 can be moved closer to the physical display edge 490. The formation of the second trench 452-2 (sometimes referred to herein as the sealant adhesion improvement trench) directly over the active border circuitry provides proper sealant adhesion while preserving mechanical stability without having to push the metal routing structures away from the edge 490 of the display. Configuring a display border area in this way can help further reduce the border width while allowing wider metal paths 410' to be formed in a limited amount of area, which helps to reduce path resistance, thereby yielding better overall panel performance.

The exemplary configuration of FIG. 11 is merely illustrative and does not serve to limit the scope of the present invention. If desired, more than two types of trench structures may be formed to provide proper moisture blocking and sealant adhesion. If desired, the techniques described herein may be further extended to TFT display layers with two or more planarization layers that are formed using two or more separate lithography masks. If desired, the embodiments described herein may be applied to other types of display that include use of sealant and that are prone to moisture damage.

Figure 12A:
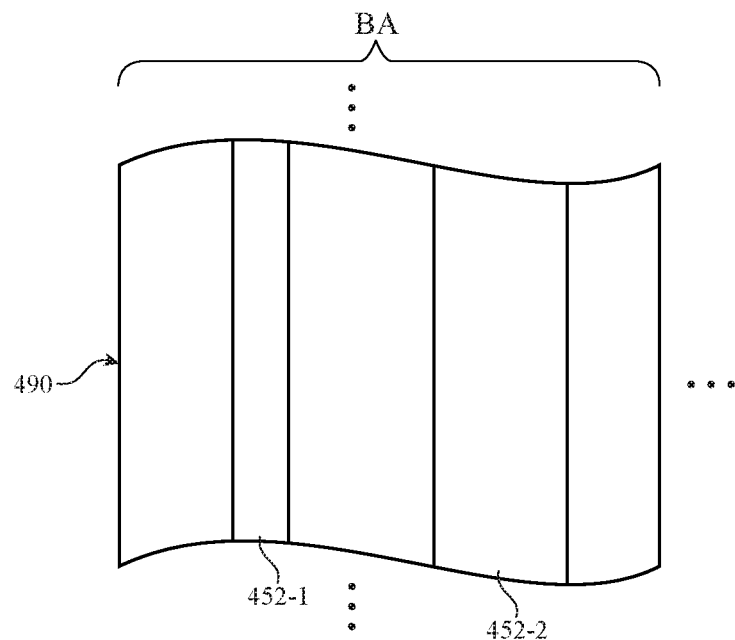
FIG. 12A is a top view showing how the sealant adhesion improvement trench of FIG. 11 can be formed as a continuous trench structure in accordance with an embodiment.
Figure 12B:
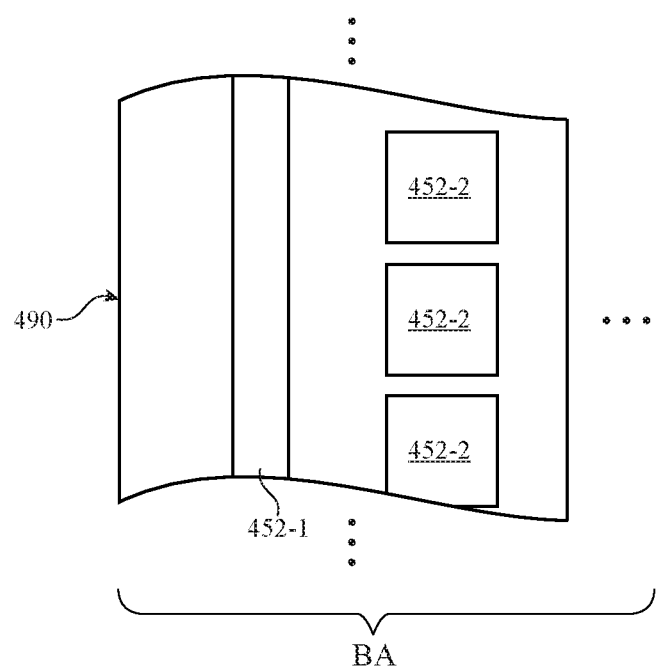
FIG. 12B is a top view showing how the sealant adhesion improvement trench of FIG. 11 can be formed as multiple discrete trench structures in accordance with another embodiment.

In general, the moisture blocking trench 452-1 should be formed as a continuous ring structure along the edges of the display. FIG. 12A is a top view showing how the sealant adhesion improvement trench 452-2 can also be formed as a continuous trench structure in the border area BA of the display. This arrangement is merely illustrative and does not serve to limit the scope of the present invention. FIG. 12B shows another suitable arrangement in which sealant adhesion improvement trench 452-2 can be formed as multiple discrete trench structures. In general, trench 452-2 can be configured to have any desired shape or dimension so long as sealant 164 is sufficiently attached to the TFT display layer.

Figure 13:
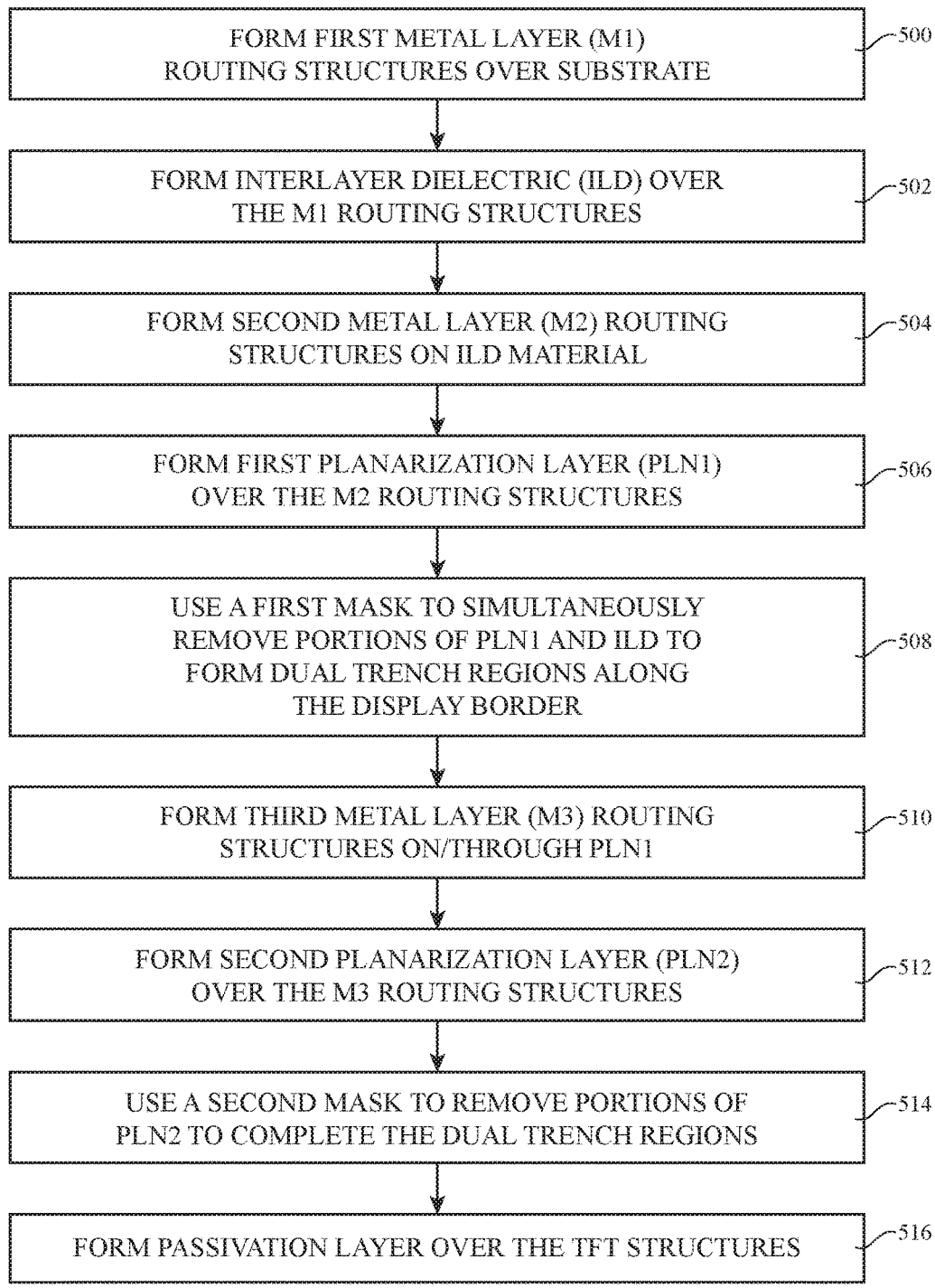
FIG. 13 is a flow chart of illustrative steps for fabricating display structures of the type shown in FIG. 11 in accordance with an embodiment.

FIG. 13 is a flow chart of illustrative steps for fabricating display structures of the type shown in FIG. 11 in accordance with an embodiment. At step 500, first metal layer (M1) routing structures 406 may be formed over a substrate layer (e.g., a TFT glass substrate). At step 502, one or more ILD layers 404 may be formed over the M1 metal routing structures 406.

At step 504, second metal layer (M2) routing structures 410 may be formed on ILD layer 404. At step 506, the first planarization layer 406-1 may be formed over the M2 routing structures 410.

At step 508, a first photolithographic mask may be used to simultaneously remove portions of planarization layer 406-1 and ILD layer 404 to partially form first trench region 452-1 and second trench region 452-2. In particular, the second trench region 452-2 should be formed directly on an adequately wide M2 metal routing path 410' (e.g., a metal routing path for carrying a global power supply voltage) to prevent any ILD etching undercut.

At step 510, third metal layer (M3) routing structures 420 may be formed on the first planarization layer 406-1. If desired, the M3 metal routing structures 420 may also be formed within the second trench 452-2 to make physical contact with the underlying M2 metal routing structures 410'.

At step 512, the second planarization layer 406-2 may be formed over the M3 routing structures 420. At step 514, a second photolithographic mask may be used to remove portions of planarization layer 406-2 to complete the formation of first trench region 452-1 and second trench region 452-2. At step 516, passivation layer 408 may be formed over the TFT structures 400. If desired, passivation layer 408 may be selectively removed from the first moisture blocking trench 452-1 to further enhance moisture protection.

The foregoing is merely illustrative and various modifications can be made by those skilled in the art without departing from the scope and spirit of the described embodiments. The foregoing embodiments may be implemented individually or in any combination.

What is claimed is:

1. A display having an active area and a border area, comprising:
   a substrate;
   display pixels that are formed over the substrate in the active area;
   a moisture blocking trench that is formed over the substrate in the border area;
   a sealant adhesion improvement trench that is separate from the moisture blocking trench and that is formed over the substrate in the border area;
   a first conductive routing layer; and
   a second conductive routing layer that is different than the first conductive routing layer and that is formed on top of the first conductive routing layer in the sealant adhesion improvement trench, wherein the first conductive routing layer is coupled to the second conductive routing layer.

2. The display defined in claim 1, further comprising:
   sealant that is dispensed at least partially within the sealant adhesion improvement trench.

3. The display defined in claim 2, further comprising:
   liquid crystal material is that retained within the display by the sealant.

4. The display defined in claim 1, wherein the moisture blocking trench is narrower than the sealant adhesion improvement trench.

5. The display defined in claim 1, wherein the moisture blocking trench comprises a continuous trench structure that completely surrounds the display.

6. The display defined in claim 1, wherein the moisture blocking trench is devoid of any conductive routing structures.

7. The display defined in claim 1, further comprising:
   a passivation layer formed over the sealant adhesion improvement trench, wherein the moisture blocking trench is devoid of the passivation layer.

8. The display defined in claim 1, wherein the first conductive routing structure has a width that is formed at least directly under the sealant adhesion improvement trench, and wherein the sealant adhesion improvement trench has a width that is smaller than the width of the first conductive routing structure.

9. A method of manufacturing a display having an active area and a border area, comprising:
   forming a dielectric layer over a substrate;
   forming a conductive structure on the dielectric layer;
   forming a planarization layer on the dielectric layer and on the conductive structure;
   forming an additional planarization layer on the planarization layer;
   forming a moisture blocking trench in the border area by simultaneously removing a portion of the planarization layer and the dielectric layer;
   forming conductive routing structures in the border area only outside the moisture blocking trench; and
   forming a sealant adhesion improvement trench that is separate from the moisture block trench in the border area.

10. The method defined in claim 9, further comprising:
    dispensing sealant at least partially within the sealant adhesion improvement trench.

11. The method defined in claim 9, wherein forming the planarization layer comprises forming an organic polymer layer on the dielectric layer.

12. The method defined in claim 9, wherein the conductive structure is directly under the sealant adhesion improvement trench, and wherein the conductive structure is at least wider than the sealant adhesion improvement trench.

13. The method defined in claim 9, further comprising:
    forming the moisture blocking trench and the sealant adhesion improvement trench by removing portions of the additional planarization layer.

14. A display having an active area and a border area, comprising:
    a substrate;
    display pixels formed over the substrate in the active area;
    a fixed power supply routing structure formed over the substrate in the border area;
    a planarization layer formed on the fixed power supply routing structure;
    a sealant adhesion improvement trench that is formed through the planarization layer directly over the fixed power supply routing structure in the border area, wherein the sealant adhesion improvement trench is narrower than the fixed power supply routing structure; and
    a conductive structure formed on the planarization layer, wherein the conductive structure lines the bottom and sidewalls of the sealant adhesion improvement trench and is electrically connected to the fixed power supply routing structure.

15. The display defined in claim 14, further comprising:
    sealant that is dispensed at least partially within the sealant adhesion improvement trench.

16. The display defined in claim 14, further comprising:
    a display edge; and
    a moisture prevention trench that is interposed between the display edge and the sealant adhesion improvement trench in the border area.

17. The display defined in claim 16, wherein the moisture prevention trench and the sealant adhesion improvement trench each comprise a contiguous trench structure that completely surrounds the display.

18. The display defined in claim 16, wherein the sealant adhesion improvement trench comprises a trench in a plurality of discrete trench structures that are formed along the border area of the display.

* * * * *